United States Patent [19]

Kudamatsu et al.

[11] 3,852,318

[45] Dec. 3, 1974

[54] SUBSTITUTED BENZYL-THIOLCARBAMIC ACID ESTERS

[75] Inventors: Akio Kudamatsu; Masao Miyamoto; Nobuo Fukazawa, all of Tokyo, Japan

[73] Assignee: Bayer-Aktiengesellschaft, Leverkusen, Germany

[22] Filed: Aug. 10, 1971

[21] Appl. No.: 170,655

Related U.S. Application Data

[63] Continuation of Ser. No. 875,546, Nov. 10, 1969, abandoned.

[30] Foreign Application Priority Data

Nov. 12, 1968 Japan.............................. 43-82249

[52] U.S. Cl...... 260/455 A, 260/293.73, 260/326.4, 260/609 R, 260/455 B, 71/94, 71/95, 71/100, 424/267, 424/274, 424/300
[51] Int. Cl............................................ C07c 155/02
[58] Field of Search......... 260/455 A, 293.73, 326.3

[56] References Cited
UNITED STATES PATENTS
3,133,947   5/1964   Tilles .............................. 260/455 A
FOREIGN PATENTS OR APPLICATIONS
201,380   11/1967   U.S.S.R........................... 260/455 A

*Primary Examiner*—Henry R. Jiles
*Assistant Examiner*—S. D. Winters
*Attorney, Agent, or Firm*—Burgess, Dinklage & Sprung

[57] ABSTRACT

Substituted benzyl-thiolcarbamic acid esters, i.e. S-[(alkoxy)-(optionally chloro, bromo, nitro and alkyl substituted)-benzyl]-[N-alkyl and N,N-dialkyl]-thiolcarbamic acid esters and S-[(alkoxy)-(optionally chloro, bromo, nitro and alkyl substituted)-benzyl]-[pyrrolidino and piperidino]-carbothiolic acid esters, which possess herbicidal properties and which may be produced by conventional methods.

18 Claims, No Drawings

SUBSTITUTED BENZYL-THIOLCARBAMIC ACID ESTERS

This application is a continuation of Ser. No. 875,546 filed Nov. 10, 1969, and now abandoned.

The present invention relates to and has for its objects the provision for particular new substituted benzylthiolcarbamic acid esters, i.e., S-[(alkoxy)-(optionally chloro, bromo, nitro and alkyl substituted)-benzyl]-[N-alkyl and N,N-dialkyl]-thiolcarbamic acid esters and S-[(alkoxy)-(optionally chloro, bromo, nitro and alkyl substituted)-benzyl]-[pyrrolidino and piperidino]-carbothiolic acid esters, which possess herbicidal properties, active compositions in the form of mixtures of such compounds with solid and liquid dispersible carrier vehicles, and methods for producing such compounds and for using such compounds in a new way, especially for combating weeds, e.g. undesired plants and the like, with other and further objects becoming apparent from a study of the within specification and accompanying examples.

It is already known that pentachloro-phenol (A), which may be designated PCP, and 2-methyl-4-chlorophenoxyacetic acid (B), which may be designated MCP, as well as S-benzyl-N,N-dimethyldithiocarbamate (C), which may be designated T, possess herbicidal properties.

Pentachlorophenol (A), i.e. PCP, is used for controlling barnyard grass. However, PCP possesses disadvantages such as an irritant effect on human skin and mucous membranes and specific toxicity to fish and shells, which limit the application periods and fields of use of such compound. To control spikerushes (*Eleocharis acicularis*) which commonly grow together with barnyard grass (*Echinochloa crus-galli*), 2-methyl-4-chlorophenoxyacetic acid (B), i.e. MCP, is used, but this compound is not effective in controlling barnyard grass.

Accordingly, in order to control simultaneously both barnyard grass and spikerushes, the main types of weeds found in paddy fields, a mixture of PCP and MCP is generally used.

It is furthermore known from French Patent 1,328,112 that benzyl dialkylthiocarbamates, i.e. benzyl, di-butyl, di-iso-propyl-, di-n-propyl and di-ethylthiocarbamate possess herbicidal properties. In said French Patent it is indicated that benzyl di-iso-propyl thiocarbamate (D) is an active herbicide against wild oats (Avena fatua).

It has now been found, in accordance with the present invention, that the particular new substituted benzyl-thiolcarbamic acid esters of the formula

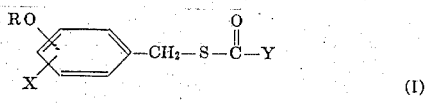

(I)

in which
R is alkyl of 1-4 carbon atoms,
X is hydrogen, chloro, bromo, nitro or alkyl of 1-4 carbon atoms, and
Y is alkylamino having 1-4 carbon atoms, dialkylamino having 1-4 carbon atoms in each alkyl moiety, pyrrolidino or piperidino, exhibit strong, especially selective herbicidal properties.

It has been furthermore found, in accordance with the present invention, that the compounds of formula (I) above may be produced by the process which comprises a. reacting an alkoxy-benzyl mercaptan or mercaptide of the formula

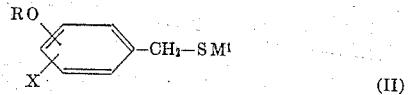

(II)

in which
R and X are the same as defined above, and
$M^1$ is a hydrogen or an alkali metal such as sodium or potassium, and the like, especially sodium, with a carbamyl chloride of the formula

(III)

in which
Y is the same as defined above;
or a'. reacting an alkoxy-benzyl mercaptan of the formula

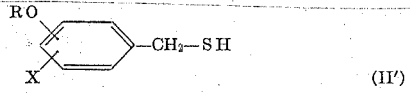

(II')

in which
R and X are the same as defined above, with an isocyanate of the formula

OCN—Y'

(III')

in which
Y' is alkyl of 1-4 carbon atoms;
or b. reacting an alkoxy-benzyl halide of the formula

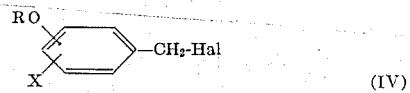

(IV)

in which
R and X are the same as defined above, and
Hal is a halogen atom such as chloro, bromo, iodo or fluoro, especially chloro, with carbonylsulfide of the formula

COS (V)

and with an amine of the formula HY    (VI)

in which
Y is the same as defined above, in the presence of a base of the formula $M^2$—OH (VII)

in which
$M^2$ is alkali metal such as sodium, potassium, and the like, especially sodium;
or c. reacting an alkoxy-benzyl thiolcarbonyl chloride of the formula

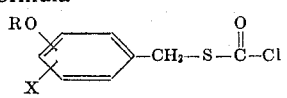

(VIII)

in which
R and X are the same as defined above, with an amine of formula (VI).

Surprisingly, the particular new compounds of formula (I) above according to the present invention show both higher and more specific herbicidal effectiveness than the previously known compounds which are known to be usable for such purposes, e.g. compounds (A), (B), (C) and (D) above. The instant compounds are especially effective as herbicides in the control of weeds in paddy rice fields, particularly barnyard grass and spikerushes, and exhibit a remarkable effect in killing such weeds, with only slight, if any, phytotoxic effect toward cultivated plants such as rice. The instant compounds also show acaricidal and nematocidal effectiveness. The instant compounds therefore represent a valuable contribution to the art.

Advantageously, in accordance with the present invention, in the various formulae herein:

R represents
straight and branched chain lower alkyl hydrocarbon of 1-4 carbon atoms such as methyl, ethyl, n- and iso-propyl, n-, iso-, sec.- and tert.-butyl, and the like, especially $C_{1-3}$ or $C_{1-2}$ alkyl;

X represents
hydrogen,
chloro, i.e. o-, m- and p- chloro, especially 3- and 5- chloro,
bromo, i.e. o-, m- and p- bromo, especially 5-bromo,
nitro, i.e. o-, m- and p- nitro, especially 3-nitro, or straight and branched chain lower alkyl hydrocarbon of
1-4 carbon atoms such as methyl to tert-butyl inclusive, as defined above, and the like, i.e. o-, m- and p- $C_{1-4}$ alkyl, especially $C_{1-3}$ or $C_{1-2}$ alkyl, and more especially 3- and 5-$C_{1-2}$ alkyl; and Y represents
alkylamino having 1-4 carbon atoms such as methyl to tert.-butyl inclusive, as defined above, -amino, and the like, especially $C_{1-3}$ or $C_{1-2}$ alkylamino,
dialkylamino having 1-4 carbon atoms in each alkyl radical such as di (same and mixed) methyl to tert.-butyl inclusive, as defined above, -amino, and the like, especially di (same and mixed) $C_{1-3}$ or $C_{1-2}$ alkyl amino,
pyrrolidino, or
piperidino.

Preferably, R is $C_{1-4}$ alkyl; X is hydrogen; or chloro; or bromo; or nitro; or $C_{1-3}$ alkyl; and Y is $C_{1-3}$ alkylamino; or di $C_{1-4}$ alkylamino; or pyrrolidino; or piperidino.

In particular, R is $C_{1-3}$ alkyl; X is hydrogen; or chloro; or bromo; or $C_{1-2}$ alkyl; and Y is $C_{1-2}$ alkylamino; or di $C_{1-4}$ alkylamino; or pyrrolidino; or piperidino.

The reaction courses according to process variants (a), (b) and (c) are illustrated by the following respective formula schemes:

(a)

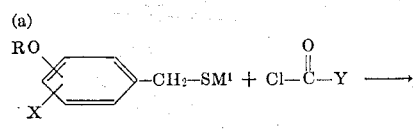

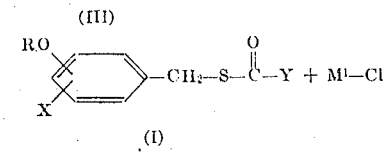

(b)

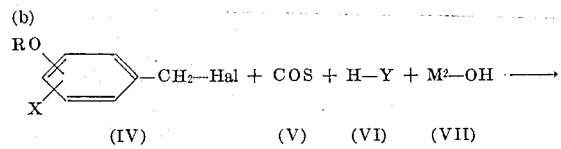

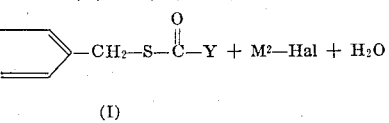

(c)

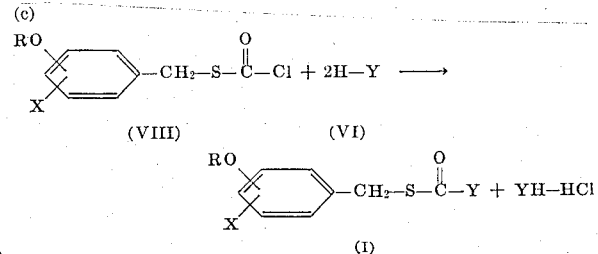

The starting materials which may be used for reaction variants (a), (b) and (c) are clearly characterized by formulae (II), (III), (IV), (V), (VI), (VII) and (VIII) above, and are well known.

As examples of alkoxy-benzyl mercaptans and mercaptides of formula (II) above which may be used as starting materials, there are mentioned: 2-, 3- and 4-methoxy, ethoxy, n- and iso-propoxy, n-, iso-, sec.- and tert.-butoxy-(optionally 3- or 5- chloro, bromo, nitro, methyl, ethyl, n- and iso-propyl, n-, iso-, sec.- and tert.-butyl)-benzyl mercaptans and the corresponding sodium mercaptides, and the like.

As examples of carbamyl chlorides of formula (III) above which may be used as starting materials, there are mentioned: mono and di (same and mixed) methyl, ethyl, n- and isopropyl, n-, iso, sec.- and tert.-butyl carbamyl chlorides, and pyrrolidino and piperidino carbonyl chlorides, and the like.

As examples of alkoxy-benzyl halides of formula (IV) above which may be used as starting materials, there are mentioned:

2-, 3- and 4-methoxy, ethoxy, n- and iso-propoxy, n-, iso-, sec.- and tert.-butoxy-(optionally 3- or 5- chloro, bromo, nitro, methyl, ethyl, n- and iso- propyl, n-, iso-, sec.-and tert.-butyl)-benzyl chlorides, bromides, iodides and fluorides, and the like.

As examples of amines of formula (VI) above which may be used as starting materials, there are mentioned: mono and di (same and mixed) methyl, ethyl, n- and iso-propyl, n-, iso-, sec.- and tert.-butyl amines, pyrrolidine and piperidine, and the like.

As examples of bases of formula VII above which may be used as starting materials, there may be mentioned: sodium, potassium, etc., hydroxides, and the like.

As examples of alkoxy-benzyl thiolcarbonyl chlorides of formula (VIII) above which may be used as starting materials, there are mentioned: 2-, 3- and 4-methoxy, ethoxy, n- and iso-propoxy, n-, iso-, sec.- and tert.-butoxy-(optionally 3- or 5-chloro, bromo, nitro, methyl, ethyl, n- and iso-propyl, n-, iso, sec.- and tert.-butyl)-benzyl thiolcarbonyl chlorides, and the like.

The process according to each of the variants is preferably carried out in the presence of an inert organic solvent (this term includes a mere diluent). Examples of such solvents include aliphatic or aromatic hydrocarbons (which may be halogenated), for example benzine, methylene chloride, chloroform, carbon tetrachloride, benzene, chlorobenzene, toluene, and xylene; ethers, for example diethyl ether, dibutyl ether, dioxan, and tetrahydrofuran; aliphatic alcohols or ketones which have low boiling points, for example methanol, ethanol, isopropanol, acetone, methyl ethyl ketone, methyl isopropyl ketone, and methyl isobutyl ketone; and the like. Lower aliphatic nitriles, for example acetonitrile, propionitrile, and the like, may also be used.

If $M^1$ is hydrogen in the appropriate starting compound of formula (II) above, the reaction according to variant (a) may preferably be carried out in the presence of an acid-binding agent. Examples of these include alkali metal carbonates and bicarbonates or alcoholates, such as potassium carbonate, sodium bicarbonate, sodium carbonate, or sodium or potassium methylate or ethylate, or aliphatic, aromatic or heterocyclic tertiary bases such as triethylamine, diethylaniline, pyridine, and the like.

The reaction according to all of the process variants may be carried out within a fairly wide temperature range, but in general at temperatures from substantially between about 0–100°C, preferably between about 10°–60°C.

In carrying out process variant (a) one may for example proceed as follows:

1 mol of the carbamyl chloride of formula (III) above is dissolved in one of the above-noted solvents, preferably methyl ethyl ketone, and to this solution is added 1 mol of the alkali salt of alkoxy-benzyl mercaptan of formula (II) above and the mixture is refluxed, e.g. at 50°–60°C, with stirring. Then the mixture is filtered to remove alkali metal chloride precipitate, and the solvent removed by distillation. If desired, the crude crystals can be purified by recrystallizing, for instance from alcohol.

The compounds of the present invention are generally colorless or light yellow chemical substances which are hardly soluble in water, yet soluble in organic solvents, such as alcohol, ketone, benzene, etc.

Advantageously, the instant active compounds exhibit a strong herbicidal potency and can therefore be used as weedkillers. By weeds in the sense used herein are meant all plants which grow in places where they are not desired. Whether the active compounds according to the present invention act as total or selective herbicidal agents depends on the amount applied, as the artisan will appreciate.

The active compounds according to the present invention can be used for example in the case of the following plants: dicotyledons, such as mustard (*Sinapis*), cress (Lepidium), catch weed (Galium), common chickweed (Stellaria), camomile (Matricaria), French weed (Galinsoga), goose-foot (Chenopodium), stinging nettle (Urtica), groundsel (Senecio), wild amaranth (Amaranthus), common purslane (Portulaca), cotton (Gossyppium), beets (Beta), carrots (Daucus), beans (Phaseolus), potatoes (Solanum), coffee (Coffea), cabbage (Brassica), spinach (Spinacia); monocotyledons, such as timothyl (Phleum), meadowgrass (Poa), fescue (Festuca), finger grass (Digitaria), goosegrass (Eleusine), green foxtail (Setaria), raygrass (Iolium), cheat (Bromus), barnyard grass (Echinochloa), maize (Zea), rice (Oryza), oats (Avena), barley (Hordeum), wheat (Triticum), millet (Panicum) and sugar cane (Saccharum); and the like.

In particular, broad leaved weeds such as *Monochoria vaginalis, Rotala indica, Lindernia pyxidaria, Gratiola japonica*, and the like, may be controlled by the active compounds of the present invention.

The instant compounds are preferably used as selective herbicides and especially when applied to soil before germination, although they exhibit a particularly good selectivity when applied either before or after emergence.

The instant active compounds possess excellent herbicidal properties, being especially effective in the control of weeds in paddy fields, particularly barnyard grass and spikerushes. Thus, when barnyard grass is treated in its pre-emergence stage or in its one to three leaf stage under irrigated conditions with the present compounds, such compounds are found to exhibit a strong herbicidal effect. This is technically of great importance, because most of the herbicides now on the market are only effective against barnyard grass before or immediately after germination. Moreover, since the instant compounds are less phytotoxic to rice plants, they can be applied one to two weeks after the transplantation of rice plants to control weeds in paddy fields, for which time span no appropriate weed-controlling method has been found heretofore, the latter being a great advantage in connection with labor-saving considerations in agricultural cultivation.

Since the compounds of the present invention possess, in particular, strong herbicidal activity by reason of root-absorption, they can also be utilized effectively as non-selective or selective herbicides (depending on their application methods) against weeds growing in places other than paddy fields.

Furthermore, the present compounds are effective acaricides, e.g., when applied to plants, especially against spider mites, including resistant strains, substantially without phytotoxicity to the plants.

It is also possible to control rice white-tip nematodes with the instant active compounds, e.g., by treating seed contaminated therewith.

The active compounds according to the instant invention can be utilized, if desired, in the form of the usual formulations or compositions with conventional inert (i.e., plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carrier and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol. etc.), ethers, ether-alcohols (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, montmorillonite, clay, etc.), and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sufonates, etc., and especially alkyl arylpolyglycol ethers, magnesium stearate, sodium oleate, etc.); and/or dispersing agents, such as pulp sulfite waste liquors, methyl cellulose, lignin, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, insecticides, acaricides and nematocides, or fungicides, bactericides, plant growth regulators, soil disinfectants, including phenoxy compounds, chlorophenol compounds, carbamates, diphenyl ethers, urea compounds, triazine compounds, and other known agricultural chemicals and/or fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.001–30%, preferably 0.05–10%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.001–95%, preferably 0.05–95%, by weight of the mixture.

In particular, the amount of active compound applied per unit area varies according to the purpose intended, i.e. the effect desired, and the mode of application. In general, higher quantities of substantially between about 6–40 kg of active compound per hectare are applied for total or nonselective herbicidal activity, whereas lower quantities of substantially between about 1.25–5 kg of active compound per hectare are applied for selective herbicidal activity, i.e., irrespective of the presence or absence of the carrier vehicle.

The active compounds can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quat./acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used as herbicides particularly effectively according to the preemergence method, they are also effective when used according to the post-emergence method.

Especially, when application is carried out mainly before the germination of cultivated plants, the general conditions of cultivation are not so important, but the quantity of active compound to be applied per unit area and the application method are important, as the artisan will appreciate.

Furthermore, the present invention contemplates methods of selectively killing, combatting or controlling undesired plants, e.g., weeds, and the like, which comprise applying to at least one of (a) such weeds and (b) their habitat, i.e., the locus to be protected, a herbicidally effective or toxic amount of the particular active compound of the invention alone or together with a carrier vehicle as noted above. The instant formulations or compositions are applied in the usual manner, for example by spraying, atomizing, scattering, dusting, watering, sprinkling, pouring, dressing, and the like.

It will be realized, of course, that the concentration of the particular active compound utilize in admixture with the carrier vehicle will depend upon the intended application and may be varied within a fairly wide range depending upon the weather conditions, the soil, the purpose for which the active compound is used, e.g., for total or only selective herbicidal effect, and the plants which are to be controlled or protected. Therefore, in special cases, it is possible to go above or below the aforementioned concentration ranges and amounts per unit area.

The following illustrate, without limitation, examples of formulations which may be used in accordance with the present invention:

FORMULATION A

5% by weight of instant compound (1), and 95% by weight of a mixture of talc and clay (3:1) are formulated into a dust by mixing and crushing. It is applied as is by dusting to weeds and/or their habitat.

FORMULATION B

20% by weight of instant compound (17), 75% by weight of talc and clay (3:2), 3% by weight of sodium alkylbenzene sulfonate, and 2% by weight of sodium dinaphthylmethane disulfonic acid, are formulated into a wettable powder by mixing and crushing. It is diluted with water at the concentration of 1 to 500, and applied by spraying to weeds and/or their habitat.

FORMULATION C

20% by weight of instant compound (18), 75% by weight of xylol, and 5% by weight of emulsifier Sorpol (trade name of the product of Toho Kagaku Kogyo K.K., Japan; polyoxyethylenealkylarylether) are formulated into an emulsifiable concentrate by mixing and stirring. It is diluted with water at the concentration of 1 to 1,000, and applied by spraying to weeds and/or their habitat.

FORMULATION D

Instant compound (24) is dissolved in xylol by heating, and the solution is sprayed onto clay granules while rotating and mixing until the granules have absorbed about 10% by weight of the active compound. The granular formulation is applied by scattering on the surface of soil.

The herbicidal effectiveness of the particular new compounds of the present invention is illustrated, without limitatin, by the following Examples:

EXAMPLE 1

Test against weeds of paddy fields

Preparation of active compounds:
Carrier vehicle    5 parts by weight of acetone
                   or 5 parts by weight of talc
Emulsifier         1 part by weight of benzyl-
                   oxypolyglycolether To produce a suitable preparation of the particular active compound, 1 part by weight of such active compound is mixed with the stated amount of carrier vehicle and the stated amount of emulsifier intimately, and the resulting emulsifiable concentrate or wettable powder is then diluted with water to the desired final concentration.

Test method

Pots of 1/5,000 a. are charged with paddy field soil and then filled with water. Paddy rice seedlings (Jukkoku variety) at the 3 to 4 leaves stage are transplanted into the pots under irrigated conditions. After the seedlings have taken root, seeds of barnyard grass and broad-leaved weeds are sown and spikerush are planted in such pots simultaneously.

The preparations of the given active compound are sprayed at the rate of 500, 250 and 125 g of active compound per 10 a. onto the soil of pots. After 3 weeks, the degree of damage against the barnyard grass, spikerush and broadleaved weeds and the phytotoxicity to the paddy rice are determined and characterized by the values 0 to 5, which have the following scales:

| Herbicidal efficacy | | Phytotoxicity | |
|---|---|---|---|
| 5 | Plants are completely dead or no germination occurs | 5 | Plants are completely dead |
| 4 | Plants are partially destroyed or 20% or less germinated | 4 | Remarkable damage |
| 3 | Plants are remarkably damaged or 50% or less germinated | 3 | Marked damage |
| 2 | Plants are markedly damaged or 70% or less germinated | 2 | Small damage |
| 1 | Plants are slightly damaged or 90% or less germinated | 1 | Slight damage |
| 0 | No effect | 0 | No phytotoxicity |

The particular active compounds tested and the results obtained can be seen from the following Table 1:

Table 1

Herbicidal effect against weeds of paddy fields and phytotoxicity to rice

| Active Compound No. (see Table 5) | Amount of active compound in g/10 a. | Herbicidal effect | | | Phytotoxicity |
|---|---|---|---|---|---|
| | | barnyard-grass | spikerush | broad-leaved weeds | paddy rice |
| Compounds of Invention | | | | | |
| (1₁) | 500 | 5 | 5 | 5 | 1 |
| | 250 | 5 | 4 | 4 | 0 |
| | 125 | 5 | 3 | 3 | 0 |
| (2₁) | 500 | 5 | 5 | 5 | 2 |
| | 250 | 5 | 4 | 4 | 1 |
| | 125 | 5 | 3 | 4 | 0 |
| (3₁) | 500 | 5 | 5 | 5 | 1 |
| | 250 | 5 | 4 | 3 | 0 |
| | 125 | 5 | 3 | 2 | 0 |
| (4₁) | 500 | 5 | 4 | 4 | 0 |
| | 250 | 4 | 4 | 4 | 0 |
| | 125 | 4 | 3 | 2 | 0 |

Table 1—Continued

Herbicidal effect against weeds of paddy fields and phytotoxicity to rice

| Active Compound No. (see Table 5) | Amount of active compound in g/10 a. | Herbicidal effect | | | Phytotoxicity |
|---|---|---|---|---|---|
| | | barnyard-grass | spikerush | broad-leaved weeds | paddy rice |
| (5₁) | 500 | 4 | 4 | 3 | 0 |
| | 250 | 3 | 3 | 3 | 0 |
| | 125 | 3 | 2 | 3 | 0 |
| (6₁) | 500 | 4 | 4 | 4 | 0 |
| | 250 | 4 | 4 | 3 | 0 |
| | 125 | 3 | 3 | 2 | 0 |
| (7₁) | 500 | 5 | 5 | 5 | 1 |
| | 250 | 5 | 4 | 3 | 0 |
| | 125 | 5 | 4 | 3 | 0 |
| (8₁) | 500 | 5 | 5 | 5 | 1 |
| | 250 | 5 | 4 | 4 | 0 |
| | 125 | 5 | 4 | 3 | 0 |
| (9₁) | 500 | 5 | 5 | 5 | 1 |
| | 250 | 5 | 4 | 4 | 0 |
| | 125 | 5 | 4 | 3 | 0 |
| (10₁) | 500 | 5 | 5 | 5 | 1 |
| | 250 | 5 | 4 | 4–5 | 0 |
| | 125 | 4–5 | 3 | 4 | 0 |
| (11₁) | 500 | 5 | 5 | 5 | 1 |
| | 250 | 4 | 3 | 3 | 0 |
| | 125 | 4 | 2 | 3 | 0 |
| (12₁) | 500 | 5 | 5 | 5 | 1 |
| | 250 | 5 | 4 | 5 | 0 |
| | 125 | 4 | 3 | 4 | 0 |
| (13₁) | 500 | 5 | 5 | 5 | 1 |
| | 250 | 5 | 4 | 5 | 0 |
| | 125 | 4 | 4 | 3 | 0 |
| (14₁) | 500 | 5 | 5 | 5 | 1 |
| | 250 | 5 | 4 | 4 | 0 |
| | 125 | 4 | 3 | 3 | 0 |
| (15₁) | 500 | 5 | 5 | 5 | 1 |
| | 250 | 5 | 3 | 4 | 0 |
| | 125 | 4–5 | 3 | 3 | 0 |
| (16₁) | 500 | 5 | 5 | 5 | 1 |
| | 250 | 5 | 4 | 5 | 0–1 |
| | 125 | 4–5 | 4 | 4 | 0 |
| (17₁) | 500 | 5 | 5 | 5 | 1 |
| | 250 | 5 | 5 | 5 | 0 |
| | 125 | 5 | 4 | 5 | 0 |
| (18₁) | 500 | 5 | 5 | 5 | 0 |
| | 250 | 5 | 5 | 5 | 0 |
| | 125 | 5 | 4 | 4–5 | 0 |
| (19₁) | 500 | 5 | 5 | 5 | 1 |
| | 250 | 5 | 4 | 4 | 0 |
| | 125 | 4 | 4 | 4 | 0 |
| (20₁) | 500 | 5 | 5 | 5 | 1 |
| | 250 | 5 | 4 | 5 | 0 |
| | 125 | 4 | 3 | 4 | 0 |
| (21₁) | 500 | 5 | 5 | 5 | 1 |
| | 250 | 5 | 4 | 4 | 0 |
| | 125 | 4 | 3 | 4 | 0 |
| (22₁) | 500 | 5 | 5 | 5 | 1 |
| | 250 | 5 | 4 | 4 | 1 |
| | 125 | 5 | 3 | 4 | 0 |
| (23₁) | 500 | 5 | 5 | 5 | 1 |
| | 250 | 5 | 4 | 3 | 0 |
| | 125 | 5 | 3 | 2 | 0 |
| (24₁) | 500 | 5 | 4 | 5 | 1 |
| | 250 | 5 | 4 | 5 | 0 |
| | 125 | 5 | 4 | 4 | 0 |

Table 1—Continued

Herbicidal effect against weeds of paddy fields and phytotoxicity to rice

| Active Compound No. (see Table 5) | Amount of active compound in g/10 a. | Herbicidal effect | | | Phytotoxicity |
|---|---|---|---|---|---|
| | | barnyard-grass | spikerush | broad-leaved weeds | paddy rice |
| (25₁) | 500 | 5 | 4 | 5 | 1 |
| | 250 | 5 | 3 | 4 | 0 |
| | 125 | 4 | 3 | 4 | 0 |
| (26₁) | 500 | 5 | 4 | 5 | 1 |
| | 250 | 5 | 4 | 5 | 0 |
| | 125 | 4 | 3 | 4 | 0 |
| (27₁) | 500 | 5 | 4 | 4 | 1 |
| | 250 | 5 | 3–4 | 4 | 0 |
| | 125 | 4 | 3 | 3 | 0 |
| (28₁) | 500 | 5 | 5 | 4 | 1 |
| | 250 | 5 | 4 | 3 | 0 |
| | 125 | 4 | 4 | 3 | 0 |
| (29₁) | 500 | 5 | 5 | 4 | 1 |
| | 250 | 5 | 4 | 4 | 0 |
| | 125 | 4 | 3–4 | 4 | 0 |
| (+₁) | 500 | 5 | 4 | 4 | 0 |
| | 250 | 4 | 4 | 4 | 0 |
| | 125 | 3 | 3 | 2 | 0 |
| (31₁) | 500 | 5 | 5 | 5 | 0 |
| | 250 | 5 | 5 | 5 | 0 |
| | 125 | 5 | 4 | 4 | 0 |
| (32₁) | 500 | 5 | 5 | 5 | 1 |
| | 250 | 5 | 4 | 5 | 0 |
| | 125 | 4–5 | 4 | 4 | 0 |
| (33₁) | 500 | 5 | 5 | 5 | 0 |
| | 250 | 5 | 3 | 4 | 0 |
| | 125 | 4–5 | 2 | 3 | 0 |
| (34₁) | 500 | 5 | 5 | 5 | 0 |
| | 250 | 5 | 5 | 5 | 0 |
| | 125 | 5 | 4 | 4 | 0 |
| (35₁) | 500 | 5 | 5 | 5 | 0 |
| | 250 | 5 | 5 | 5 | 0 |
| | 125 | 5 | 4 | 4–5 | 0 |
| (36₁) | 500 | 5 | 5 | 5 | 0 |
| | 250 | 5 | 4–5 | 5 | 0 |
| | 125 | 5 | 4 | 4 | 0 |
| (37₁) | 500 | 5 | 5 | 5 | 0 |
| | 250 | 5 | 5 | 5 | 0 |
| | 125 | 5 | 4 | 4 | 0 |
| (38₁) | 500 | 4 | 4 | 4 | 0 |
| | 250 | 3 | 3 | 3 | 0 |
| | 125 | 3 | 2 | 3 | 0 |
| (39₁) | 500 | 5 | 4–5 | 5 | 0 |
| | 250 | 5 | 4 | 5 | 0 |
| | 125 | 4 | 3 | 4–5 | 0 |
| Known Compounds - Comparison | | | | | |
| (A) penta-chloro phenol | 1000 | 5 | 5 | 5 | 5 |
| (B) 2-methyl-4-chloro-phenoxy-acetic acid | 40 | 2 | 5 | 5 | 4 |
| (C) S-benzyl-N,N-dimethyl-dithio-carbamate | 500 | 4 | 3 | 5 | 0 |
| | 250 | 3 | 1 | 3 | 0 |
| | 125 | 2 | 0 | 2 | 0 |
| (D) S-benzyl-N,N-diiso-propyl-thiol-carbamate | 500 | 5 | 5 | 5 | 4 |
| | 250 | 4 | 4 | 4 | 3 |
| | 125 | 3 | 2–3 | 3 | 1 |
| Control | — | 0 | 0 | 0 | 0 |

NOTE:
Broad-leaved weeds are *Monochoria vaginalis*, *Rotala indica*, *Lindernia pyxidaria*, *Gratiola japonica*, etc.

EXAMPLE 2

Test of pre-emergence soil treatment against various plants

To produce a suitable preparation of the particular active compound, 1 part by weight of such active compound is mixed with 5 parts by weight of solvent (acetone) and 1 part by weight of emulsifier (benzyloxypolyglycol ether), and the resulting emulsifiable concentrate is then diluted with water to the desired final concentration.

Seeds of the test plants are sown in normal soil and after 24 hours the preparation of the given active compound is sprayed onto the test plants. After 3 weeks, the degree of damage to the test plants is determined and characterized by the values 0 to 5, which have the following meaning:

0 No effect
1 Slight damage or slight growth delay
2 Marked damage or growth delay
3 Remarkable damage or only 50% germinated
4 Plants are partially destroyed after germination or only 25% germinated
5 Plants are completely dead or no germination occurs.

The particular active compounds tested, their amount per unit area, and the results obtained can be seen from the following table 2;

centrations, and the results obtained can be seen from the following Table 2:

Table 3

Test against spider mites

| Active Compound No. (see Table 5) | Concentration of active compound in % | Controlling effect |
|---|---|---|
| Compounds of Invention | | |
| ($1_2$) | 0.1 | ++ |
| ($2_2$) | 0.1 | + |
| ($5_2$) | 0.1 | + |
| ($7_2$) | 0.1 | + |
| ($14_2$) | 0.1 | + |
| ($16_2$) | 0.1 | + |
| ($23_2$) | 0.1 | ++ |
| ($24_2$) | 0.1 | ++ |
| ($25_2$) | 0.1 | + |
| ($30_2$) | 0.1 | ++ |
| Known Compounds - Comparison | | |
| O,O-diethyl- S-(2,5-dichlorophenylmercaptomethyl)-phosphorodithiolate | 0.5 | ++ |
| p-chloro-phenyl-p-chloro-benzene sulfonate | 0.1 | + |
| Control | — | — |

NOTE:
Evaluation of effect is as follows:
++ No adult or nymph was found.
+ A small number of adults and nymphs were observed.
— About the same numbers of adults and nymphs were observed as in untreated pot (control).

TABLE 2

[Pre-emergence soil treatment against various plants (pot test)]

| Active Compound No. (see Table 5) | Amount of active compound in kg./ha. | Wheat | Barley | Rice | Cotton | Maize | Cabbage | Echinochloa | Portulaca | Chenopodium | Stellaria | Amaranthus | Digitaria |
|---|---|---|---|---|---|---|---|---|---|---|---|---|---|
| Compounds of invention: | | | | | | | | | | | | | |
| ($1_3$) | 20 | 5 | 5 | 5 | 5 | 5 | 5 | 5 | 5 | 5 | 5 | 5 | 5 |
| | 10 | 1-2 | 2 | 1-2 | 2 | 2 | 2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 0 | 5 | 4 | 4 | 4 | 4 | 4 |
| ($2_3$) | 20 | 5 | 5 | 5 | 5 | 5 | 5 | 5 | 5 | 5 | 5 | 5 | 5 |
| | 10 | 1-2 | 2 | 1-2 | 2 | 2 | 2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 0 | 5 | 1 | 4 | 4 | 4 | 4 |
| ($17_2$) | 20 | 4 | 4 | 5 | 4 | 3 | 5 | 5 | 5 | 5 | 5 | 5 | 5 |
| | 10 | 1-2 | 2 | 3 | 2 | 2 | 1-2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 0 | 5 | 3-4 | 3-4 | 3-4 | 3-4 | 3-4 |
| Known compound—comparison: | | | | | | | | | | | | | |
| (C) S-benzyl-N,N-dimethyl-dithiocarbamate. | 20 | 3 | 3 | 3 | 4 | 3 | 5 | 5 | 5 | 5 | 5 | 5 | 5 |
| | 10 | 1-2 | 2 | 3 | 2 | 2 | 1-2 | 5 | 5 | 5 | 5 | 5 | 5 |
| | 5 | 0 | 0 | 0 | 0 | 0 | 0 | 4 | 5 | 5 | 5 | 5 | 5 |
| | 2.5 | 0 | 0 | 0 | 0 | 0 | 0 | 3 | 5 | 5 | 5 | 5 | 5 |
| | 1.25 | 0 | 0 | 0 | 0 | 0 | 0 | 2 | 3 | 3 | 3 | 3 | 3 |

EXAMPLE 3

Test against spider mites (Pot test)

Test method:

Approximately 50 adult spider mites are put on each corresponding cotyledon leaf of kidney beans planted in unglazed pots of 6 cm diameter. Tangle-foot is pasted on the petioles to prevent the mites from running away. The pots are kept in a greenhouse and two days later appropriate diluted solutions containing the desired concentration of the given active compound are sprayed on the leaves using a spray-gun. Ten days after the active compound spraying treatment, the number of surviving and killed adults and nymphs are counted.

The particular active compounds tested, their con-

The following further examples are set forth to illustrate, without limitation, the manner of producing the instant compounds according to the present invention:

EXAMPLE 5 [variant (a)]

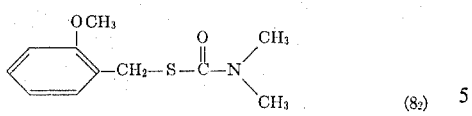

10.8 g (0.1 mol) of N,N-dimethyl-carbamoylchloride were dissolved in 200 ml of methylethyl ketone and 17.6 g (0.1 mol) of the sodium salt of o-methoxy-benzylmercaptan were added. The mixture was refluxed at 50°–60°C for about 5 hours with vigorous stirring. After the completion of the reaction, the reacted mixture was filtered, to separate off sodium chloride by-product, and crude crystals of o-methoxy-benzyl-N,N-dimethyl-thiolcarbamate were obtained with distilling off of methylethyl ketone from the filtrate. Yield: 19.4 g. M.p. 27°–28.5°C (recrystallized from alcohol).

In an analogous manner, upon reacting the appropriate sodium salt of p-methyl-benzylmercaptan, 3-methyl-4-methoxy-benzylmercaptan and 2-methoxy-5-chloro-benzylmercaptan, respectively, with N,N-dimethyl-carbamoyl-chloride, the corresponding p-methoxy-benzyl-N,N-dimethyl-thiolcarbamate ($1_5$) of m.p. 26°–27°C, 3-methyl-4-methoxy-benzyl-N,N-dimethyl-thiolcarbamate ($10_2$) of b.p. 145–146°C/0.1 mm Hg, and 2-methoxy-5-chloro-benzyl-N,N-dimethyl-thiolcarbamate ($16_4$) of m.p. 112.5–113.5°C, are obtained.

EXAMPLE 6 [variant (c)]

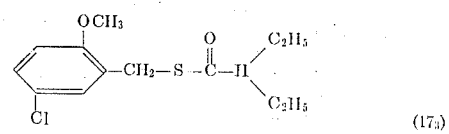

25.1 g (0.1 mol) of 2-methoxy-5-chloro-benzyl-thiolcarbonyl-chloride were dissolved in 200 ml of ether and 14.6 g (0.2 mol) of diethylamine were added dropwise. The mixture was refluxed gently at 20–25°C for about 3 hours. After completing the reaction, separating by filtration the amine salt which had precipitated, and distilling off ether from the filtrate, 2-methoxy-5-chloro-benzyl-N,N-diethyl-thiolcarbamate was obtained. Yield: 24.4 g B.p. 160°–161°C/0.1 mm Hg.

In an analogous manner, upon reacting methyl-n-butyl-amine, di-n-propyl-amine and diisopropylamine, respectively, with 2-methoxy-5-chloro-benzyl-thiolcarbonylchloride, the corresponding 2-methoxy-5-chloro-benzyl-N,N-dialkyl-thiocarbamates are obtained, i.e. 2-methoxy-5-chloro-benzyl-N-methyl-N-n-butyl-thiolcarbamate ($20_2$), 2-methoxy-5-chlorobenzyl-N,N-di-n-propyl-thiolcarbamate ($19_2$) and 2-methoxy-5-chloro-benzyl-N,N-diisopropyl-thiolcarbamate ($18_2$).

The following are examples of typical compounds of the present invention which may be prepared in the manner described above:

TABLE 5

| Compound | Structural formula | Physical property (M.P. or B.P.) |
|---|---|---|
| ($1_6$) | CH₃O—⟨⟩—CH₂—S—C(=O)—N(CH₃)(CH) | M.P. 26–27/ C. |
| ($2_5$) | CH₃O—⟨⟩—CH₂—S—C(=O)—N(C₂H₅)₂ | B.P. 162–163° C./0.9–1 mm. Hg. |
| ($3_3$) | CH₃O—⟨⟩—CH₂—S—C(=O)—N(C₃H₇-i)₂ | B.P. 143–145° C./0.1 mm. Hg. |
| ($4_2$) | CH₃O—⟨⟩—CH₂—S—C(=O)—N(CH₃)(C₄H₉-n) | B.P. 147–150° C./0.1 mm. Hg. |
| ($5_4$) | CH₃O—⟨⟩—CH₂—S—C(=O)—N⟨H⟩ | B.P. 170–173° C./0.2 mm. Hg. |
| ($6_2$) | CH₃O—⟨⟩—CH₂—S—C(=O)—N⟨H⟩ | B.P. 154–160° C./0.1 mm. Hg. |
| ($7_1$) | CH₃O, S—O, ⟨⟩—CH₂—S—C(=O)—N(CH₃)₂ | B.P. 141–143° C./0.2 mm. Hg. |
| ($8_3$) | OCH₃, ⟨⟩—CH₂—S—C(=O)—N(CH₃)₂ | M.P. 27–28.5° C. |
| ($9_2$) | OCH₃, ⟨⟩—CH₂—S—C(=O)—N(C₂H₅)₂ | B.P. 151–152° C./0.4 mm. Hg. |

Table 5 — Continued

| Compound | Structural formula | Physical property (M.P. or B.P.) |
|---|---|---|
| (10₃) | 4-CH₃O, 3-CH₃-C₆H₃-CH₂-S-C(=O)-N(CH₃)₂ | B.P. 145–146° C./0.1 mm. Hg. |
| (11₂) | 4-CH₃, 3-CH₃-C₆H₃-CH₂-S-C(=O)-N(C₂H₅)₂ | B.P. 155–157° C./0.2 mm. Hg. |
| (12₃) | 2-OCH₃, 5-CH₃-C₆H₃-CH₂-S-C(=O)-N(CH₃)₂ | M.P. 44–45° C. |
| (13₂) | 2-OCH₃, 5-CH₃-C₆H₃-CH₂-S-C(=O)-N(C₂H₅)₂ | B.P. 143–145° C./0.1 mm. Hg. |
| (14₁) | 4-CH₃O, 3-Cl-C₆H₃-CH₂-S-C(=O)-N(CH₃)₂ | M.P. 56–57° C. |
| (15₂) | 4-CH₃O, 3-Cl-C₆H₃-CH₂-S-C(=O)-N(C₂H₅)₂ | M.P. 55–56° C. |
| (16₅) | 2-OCH₃, 5-Cl-C₆H₃-CH₂-S-C(=O)-N(CH₃)₂ | M.P. 112.5–113.5° C. |
| (17₄) | 2-OCH₃, 5-Cl-C₆H₃-CH₂-S-C(=O)-N(C₂H₅)₂ | B.P. 160–161° C./0.1 mm. Hg. |
| (18₃) | 2-OCH₃, 5-Cl-C₆H₃-CH₂-S-C(=O)-N(i-C₃H₇)₂ | B.P. 146–150° C./0.1 mm. Hg. |
| (19₃) | 2-OCH₃, 5-Cl-C₆H₃-CH₂-S-C(=O)-N(n-C₃H₇)₂ | M.P. 63–64° C. |
| (20₃) | 2-OCH₃, 5-Cl-C₆H₃-CH₂-S-C(=O)-N(CH₃)(n-C₄H₉) | B.P. 152–157° C./0.08 mm. Hg. |
| (21₃) | 4-C₂H₅O-C₆H₄-CH₂-S-C(=O)-N(CH₃)₂ | B.P. 162–163° C./0.03 mm. Hg. |
| (22₂) | 4-C₂H₅O-C₆H₄-CH₂-S-C(=O)-N(C₂H₅)₂ | B.P. 160–163° C./0.05 mm. Hg. |
| (23₃) | 4-i-C₃H₇O-C₆H₄-CH₂-S-C(=O)-N(CH₃)₂ | B.P. 149–150° C./0.5 mm. Hg. |
| (24₃) | 4-i-C₃H₇O-C₆H₄-CH₂-S-C(=O)-N(C₂H₅)₂ | B.P. 162–163° C./1 mm. Hg. |

Table 5 — Continued

| Compound | Structural formula | Physical property (M.P. or B.P.) |
|---|---|---|
| (25₄) | 2-Cl-4-C₂H₅O-C₆H₃-CH₂-S-C(O)-N(CH₃)₂ | M.P. 44–45° C. |
| (26₂) | 2-Cl-4-C₂H₅O-C₆H₃-CH₂-S-C(O)-N(C₂H₅)₂ | M.P. 40–41° C. |
| (27₂) | 2-OC₂H₅-4-Cl-C₆H₃-CH₂-S-C(O)-N(CH₃)₂ | M.P. 58–59.5° C. |
| (28₂) | 2-OC₂H₅-4-Cl-C₆H₃-CH₂-S-C(O)-N(C₂H₅)₂ | B.P. 164–166° C./0.1 mm. Hg. |
| (29₃) | 2-NO₂-4-CH₃O-C₆H₃-CH₂-S-C(O)-N(CH₃)₂ | M.P. 160–170° C. |
| (30₄) | 4-CH₃O-C₆H₄-CH₂-S-C(O)-NH(CH₃) | M.P. 66–67° C. |
| (31₃) | 2-OCH₃-4-Br-C₆H₃-CH₂-S-C(O)-N(CH₃)₂ | M.P. 110–111° C. |
| (32₂) | 2-OCH₃-4-tert-C₄H₉-C₆H₃-CH₂-S-C(O)-N(CH₃)₂ | M.P. 114–116° C. |
| (33₂) | 4-CH₃O-3-Br-C₆H₃-CH₂-S-C(O)-N(C₂H₅)₂ | M.P. 71–72° C. |
| (34₂) | 4-i-C₃H₇O-3-CH₃-C₆H₃-CH₂-S-C(O)-N(CH₃)₂ | B.P. 144.5–146° C./0.23 mm. Hg. |
| (35₂) | 4-i-C₃H₇O-3-CH₃-C₆H₃-CH₂-S-C(O)-N(C₂H₅)₂ | B.P. 149–154° C./0.12 mm. Hg. |
| (36₂) | 4-i-C₃H₇O-3-Cl-C₆H₃-CH₂-S-C(O)-N(CH₃)₂ | M.P. 44–45° C. |
| (37₂) | 4-i-C₃H₇O-3-Cl-C₆H₃-CH₂-S-C(O)-N(C₂H₅)₂ | M.P. 37–38° C. |
| (38₂) | 2-OCH₃-4-CH₃-C₆H₃-CH₂-S-C(O)-NH(CH₃) | M.P. 108–109° C. |
| (39₂) | 4-C₂H₅O-3-CH₃-C₆H₃-CH₂-S-C(O)-N(C₂H₅)₂ | B.P. 159–162° C./0.12 mm. Hg. |

The foregoing compounds may be designated:
1. 4-methoxy-benzyl-N,N-dimethyl-thiolcarbamate
2. 4-methoxy-benzyl-N,N-diethyl-thiolcarbamate
3. 4-methoxy-benzyl-N,N-diisopropyl-thiolcarbamate
4. 4-methoxy-benzyl-N-methyl-N-n-butyl-thiolcarbamate
5. 4-methoxy-benzyl-pyrrolidino-carbothiolic acid ester
6. 4-methoxy-benzyl-piperidino-carbothiolic acid ester
7. 3-methoxy-benzyl-N,N-dimethyl-thiolcarbamate
8. 2-methoxy-benzyl-N,N-dimethyl-thiolcarbamate
9. 2-methoxy-benzyl-N,N-diethyl-thiolcarbamate
10. 3-methyl-4-methoxy-benzyl-N,N-dimethyl-thiolcarbamate
11. 3-methyl-4-methoxy-benzyl-N,N-diethyl-thiolcarbamate
12. 2-methoxy-5-methyl-benzyl-N,N-dimethyl-thiolcarbamate
13. 2-methoxy-5-methyl-benzyl-N,N-diethyl-thiolcarbamate
14. 3-chloro-4-methoxy-benzyl-N,N-dimethyl-thiolcarbamate
15. 3-chloro-4-methoxy-benzyl-N,N-diethyl-thiolcarbamate
16. 2-methoxy-5-chloro-benzyl-N,N-dimethyl-thiolcarbamate
17. 2-methoxy-5-chloro-benzyl-N,N-diethyl-thiolcarbamate
18. 2-methoxy-5-chloro-benzyl-N,N-diisopropyl-thiolcarbamate
19. 2-methoxy-5-chloro-benzyl-N,N-di-n-propyl-thiolcarbamate
20. 2-methoxy-5-chloro-benzyl-N-methyl-N-n-butyl-thiolcarbamate
21. 4-ethoxy-benzyl-N,N-dimethyl-thiolcarbamate
22. 4-ethoxy-benzyl-N,N-diethyl-thiolcarbamate
23. 4-isopropoxy-benzyl-N,N-dimethyl-thiolcarbamate
24. 4-isopropoxy-benzyl-N,N-diethyl-thiolcarbamate
25. 3-chloro-4-ethoxy-benzyl-N,N-dimethyl-thiolcarbamate
26. 3-chloro-4-ethoxy-benzyl-N,N-diethyl-thiolcarbamate
27. 2-ethoxy-5-chloro-benzyl-N,N-dimethyl-thiolcarbamate
28. 2-ethoxy-5-chloro-benzyl-N,N-diethyl-thiolcarbamate
29. 3-nitro-4-methoxy-benzyl-N,N-dimethyl-thiolcarbamate
30. 4-methoxy-benzyl-N-methyl-thiolcarbamate
31. 2-methoxy-5-bromo-benzyl-N,N-dimethyl-thiolcarbamate
32. 2-methoxy-5-tert.-butyl-benzyl-N,N-dimethyl-thiolcarbamate
33. 4-methoxy-5-bromo-benzyl-N,N-diethyl-thiolcarbamate
34. 4-isopropyl-5-methyl-benzyl-N,N-dimethyl-thiolcarbamate
35. 4-isopropyl-5-methyl-benzyl-N,N-diethyl-thiolcarbamate
36. 4-isopropyl-5-chloro-benzyl-N,N-dimethyl-thiolcarbamate
37. 2-isopropyl-5-chloro-benzyl-N,N-ethyl-thiolcarbamate
38. 2-methoxy-5-methyl-benzyl-N-methyl-thiolcarbamate
39. 4-ethoxy-5-methyl-benzyl-N,N-diethyl-thiolcarbamate It will be realized by the artisan that all of the foregoing compounds contemplated by the present invention possess the desired selective or total herbicidal properties, and especially the capability of selectively destroying weeds, and additionally acaricidal and nematocidal properties, as well as a comparatively low toxicity toward warm-blooded creatures and a concomitantly low phytotoxicity with respect to higher plants, enabling such compounds to be used with correspondingly favorable compatibility with respect to warmblooded creatures and higher plants for more effective control and/or elimination of weeds, mites and nematodes by selective application of such compounds to such weeds, mites, nematodes and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirably for the particular purposes in question.

It will be appreciated that the instant specification and examples are set forth by way of illustration and not limitation, and that various modifications and changes may be made without departing from the spirit and scope of the present invention.

What is claimed is:

1. A substituted benzyl-thiolcarbamic acid ester of the formula $$\text{RO}-\!\!\!\underset{X}{\bigcirc}\!\!\!-\text{CH}_2-\text{S}-\overset{\text{O}}{\underset{\|}{\text{C}}}-\text{Y}$$

in which R is alkyl of 1–4 carbon atoms, X is selected from the group consisting of chloro, bromo and alkyl of 1–4 carbon atoms, and Y is dialkylamino having 1–4 carbon atoms in each alkyl moiety.

2. A compound according to claim 1 wherein R is $C_{1-4}$ alkyl, X is selected from the group consisting of chloro, bromo and $C_{1-3}$ alkyl.

3. A compound according to claim 1 wherein R is $C_{1-3}$ alkyl, X is selected from the group consisting of chloro, bromo and $C_{1-2}$ alkyl.

4. A compound according to claim 1 of the formula $$\text{RO}-\!\!\!\underset{X}{\bigcirc}\!\!\!-\text{CH}_2-\text{S}-\overset{\text{O}}{\underset{\|}{\text{C}}}-\text{Y}$$

in which
R is lower alkyl,
X is chlorine, bromine or methyl, and
Y is diethylamino.

5. A compound according to claim 1 of the formula

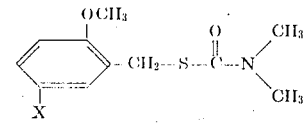

in which

X is chlorine or bromine or methyl.

6. Compound according to claim 1 wherein such compound is 4-methoxy-5-methyl-benzyl-N,N-diethyl-thiolcarbamate of the formula

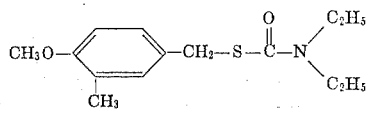

7. Compound according to claim 1 wherein such compound is 2-methoxy- 5-methyl-benzyl-N,N-dimethyl-thiolcarbamate of the formula

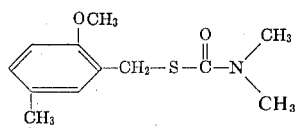

8. Compound according to claim 1 wherein such compound is 2-methoxy-5-tert.-butyl-N,N-dimethyl-thiolcarbamate of the formula

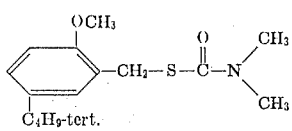

9. Compound according to claim 1 wherein such compound is 4-methoxy-5-chloro-benzyl-N,N-diethyl-thiolcarbamate of the formula

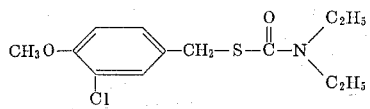

10. Compound according to claim 1 wherein such compound is 4-methoxy-5-bromo-benzyl-N,N-diethyl-thiolcarbamate of the formula

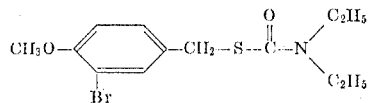

11. Compound according to claim 1 wherein such compound is 2-methoxy-5-chloro-benzyl-N,N-dimethyl-thiolcarbamate of the formula

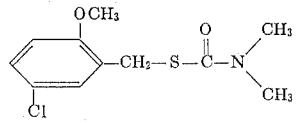

12. Compound according to claim 1 wherein such compound is 2-methoxy-5-bromo-benzyl-N,N-dimethyl-thiolcarbamate of the formula

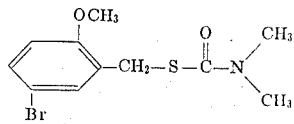

13. Compound according to claim 1 wherein such compound is 4-ethoxy-5-methyl-benzyl-N,N-diethyl-thiolcarbamate of the formula

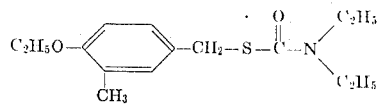

14. Compound according to claim 1 wherein such compound is 4-ethoxy-5-chloro-benzyl-N,N-diethyl-thiolcarbamate of the formula

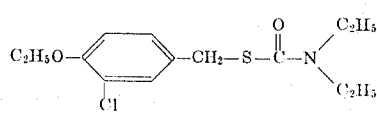

15. Compound according to claim 1 wherein such compound is 4-isopropoxy-5-methyl-benzyl-N,N-dimethyl-thiolcarbamate of the formula

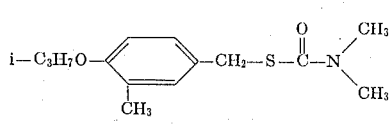

16. Compound according to claim 1 wherein such compound is 4-isopropoxy-5-methyl-benzyl-N,N-diethyl-thiolcarbamate of the formula

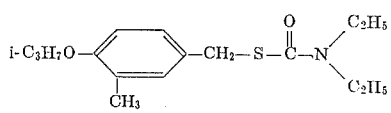

17. Compound according to claim 1 wherein such compound is 4-isopropoxy-5-chloro-benzyl-N,N-dimethyl-thiolcarbamate of the formula

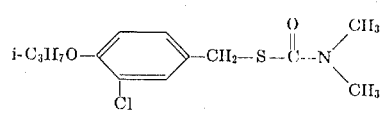

18. Compound according to claim 1 wherein such compound is 4-isopropoxy-5-chloro-benzyl-N,N-diethyl-thiolcarbamate of the formula

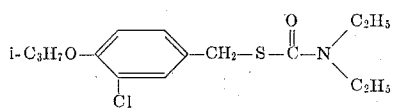

* * * * *

UNITED STATES PATENT OFFICE
CERTIFICATE OF CORRECTION

Patent No. 3,852,318  Dated  December 3, 1974

Inventor(s) Akio Kudamatsu et al

It is certified that error appears in the above-identified patent and that said Letters Patent are hereby corrected as shown below:

Col. 13, Table 1, Under heading "Active Compound, etc."

cancel " $(+_1)$ " and substitute -- $(30_1)$ --.

Col. 17, Table 5, Compound $(7_4)$, cancel the formula

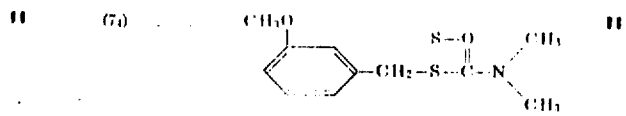

and substitute

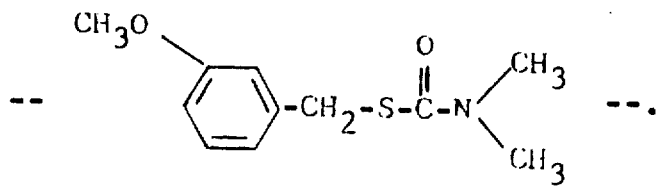

Col. 19, Table 5, Compound $(11_2)$, in the structural formula cancel " $CH_3$ " and substitute -- $CH_3O$ --.

Col. 20, Table 5, Compound $(19_3)$, cancel "M.P.63-64°" and substitute -- 62-64° --.

Signed and sealed this 6th day of May 1975.

(SEAL)
Attest:

RUTH C. MASON
Attesting Officer

C. MARSHALL DANN
Commissioner of Patents
and Trademarks